(12) United States Patent
Gannon

(10) Patent No.: US 6,470,779 B1
(45) Date of Patent: Oct. 29, 2002

(54) CARD CUTTING APPARATUS

(76) Inventor: Richard J. Gannon, 143-25 257th St., Rosedale, NY (US) 11422

( * ) Notice: Subject to any disclaimer, the term of this patent is extended or adjusted under 35 U.S.C. 154(b) by 119 days.

(21) Appl. No.: 09/648,227

(22) Filed: Aug. 25, 2000

(51) Int. Cl.[7] .............................. B26F 1/44; B26D 5/16; B26D 7/26
(52) U.S. Cl. .......................... 83/628; 83/541; 83/619; 83/698.91; 83/699.11; 483/29
(58) Field of Search .......................... 83/618, 628, 619, 83/620, 698.91, 699.11, 541; 225/96, 96.5

(56) References Cited

U.S. PATENT DOCUMENTS

| | | | |
|---|---|---|---|
| 3,906,633 A | * 9/1975 | Inoue | 83/618 X |
| 4,065,990 A | * 1/1978 | Edhlund | 83/628 X |
| 4,509,397 A | * 4/1985 | Mori et al. | 83/618 X |
| 4,879,932 A | 11/1989 | Scalise et al. | |
| 4,941,381 A | 7/1990 | Garner | |
| 4,979,612 A | 12/1990 | Melbye | |
| D319,172 S | 8/1991 | Vaccaro | |
| 5,172,622 A | * 12/1992 | Sabin | 83/520 |
| 5,303,472 A | * 4/1994 | Mbanugo | 30/124 |
| 5,555,785 A | 9/1996 | Scalise et al. | |
| 5,611,254 A | * 3/1997 | Rall | 83/618 X |
| 5,771,768 A | * 6/1998 | Malmstrom | 83/618 X |
| 5,797,830 A | 8/1998 | Flores et al. | |
| 5,827,159 A | * 10/1998 | Adachi | 483/29 |
| 6,013,017 A | * 1/2000 | Aizawa | 483/29 |
| 6,076,447 A | * 6/2000 | Damask | 83/618 |
| 6,089,137 A | * 7/2000 | Lee | 83/621 |

* cited by examiner

*Primary Examiner*—Charles Goodman

(57) ABSTRACT

A card cutting apparatus for cutting business cards out of paper stock. The card cutting apparatus includes a housing. The housing comprises a base portion and an upper portion. The base portion has an upper side and a lower side. The upper portion is hingedly coupled to the base portion such that the upper portion may be selectively positioned between an abutted position and a removed position with respect to the base portion. The upper portion has a top surface, a bottom surface, a front surface, a back surface and a pair of side surfaces. The bottom surface has a cavity therein. A rod is rotatably mounted in the upper portion, and extends through the side surfaces and through the cavity such that the rod has a pair of ends each extending away from one of the side surfaces. The rod extends through and securely attached to a cam. A handle member is coupled to each of the ends of the rod. Each of a plurality of cartridges comprises a substantially rigid panel having a top side, a bottom side, a pair of side edges, a front edge and a back edge. The bottom side of the cartridge has a plurality of depressions therein. Each of the depressions has a peripheral edge has a blade member securely attached thereto and extending away therefrom. The cartridge is removably securable in the cavity such that cam may force the cartridge downward through paper stock positioned on the base portion.

7 Claims, 10 Drawing Sheets

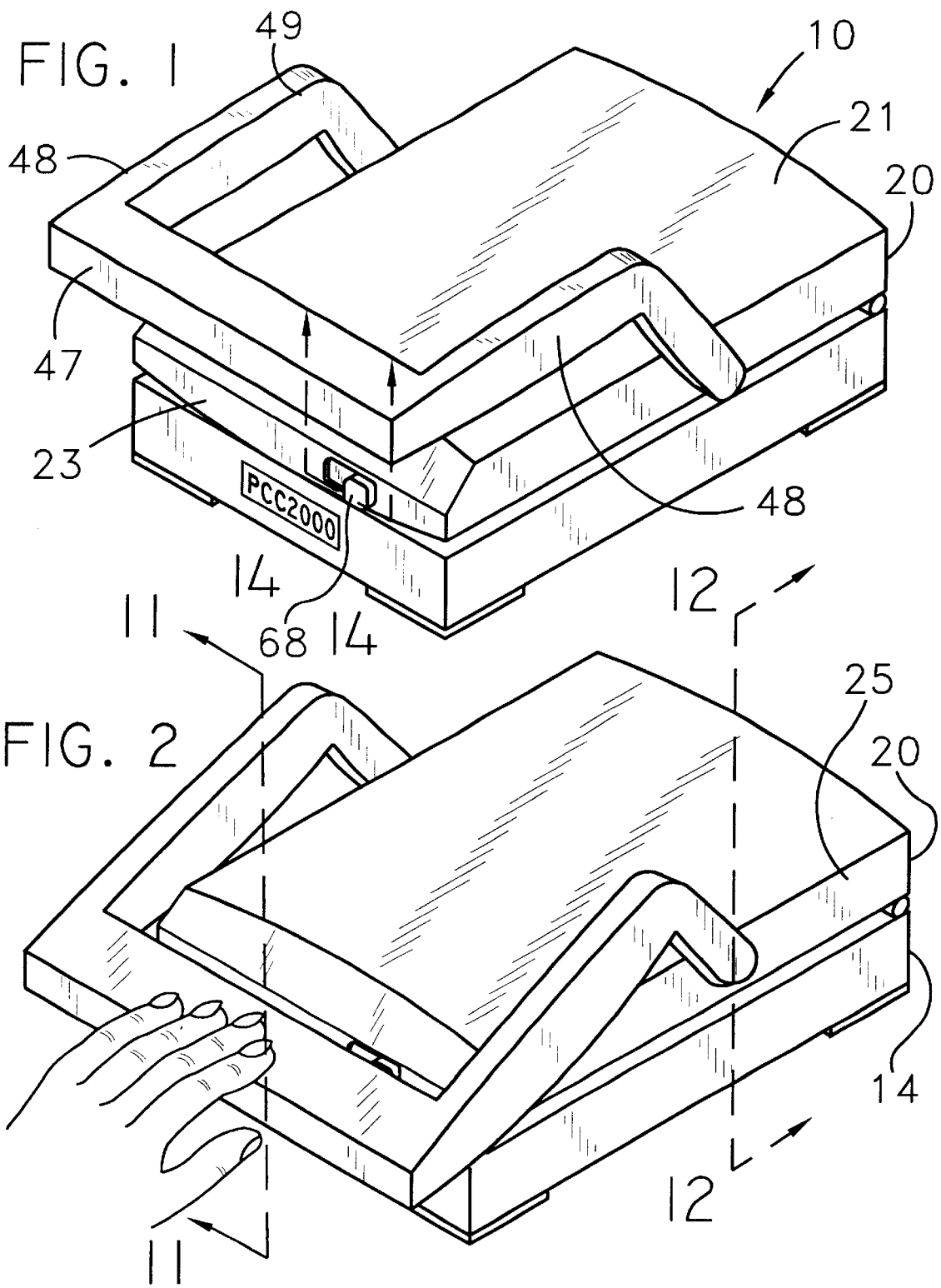

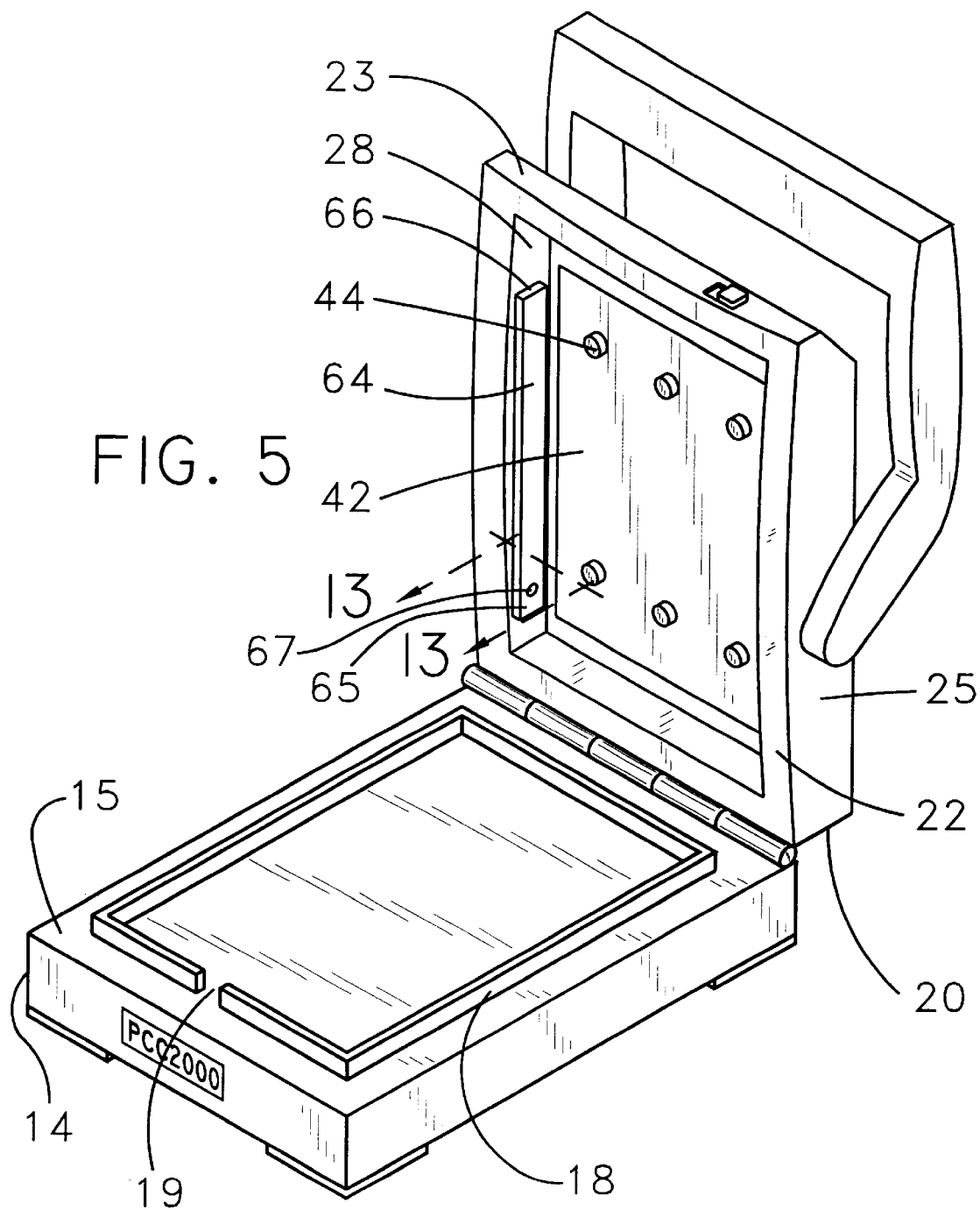

CARD CUTTING APPARATUS

BACKGROUND OF THE INVENTION

1. Field of the Invention

The present invention relates to card cutting devices and more particularly pertains to a new card cutting apparatus for cutting business cards out of paper stock.

2. Description of the Prior Art

The use of card cutting devices is known in the prior art. More specifically, card cutting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,555,785; 4,979,612; 4,941,381; 5,797,830; U.S. Des. Pat. No. 319,172; and U.S. Pat. No. 4,879,932.

While these devices fulfill their respective, particular objectives and requirements, the aforementioned patents do not disclose a new card cutting apparatus. The inventive device includes a housing. The housing comprises a base portion and an upper portion. The base portion has an upper side and a lower side. The upper portion is hingedly coupled to the base portion such that the upper portion may be selectively positioned between an abutted position and a removed position with respect to the base portion. The upper portion has a top surface, a bottom surface, a front surface, a back surface and a pair of side surfaces. The bottom surface has a cavity therein. A rod is rotatably mounted in the upper portion, and extends through the side surfaces and through the cavity such that the rod has a pair of ends each extending away from one of the side surfaces. The rod extends through and securely attached to a cam. A handle member is coupled to each of the ends of the rod. Each of a plurality of cartridges comprises a substantially rigid panel having a top side, a bottom side, a pair of side edges, a front edge and a back edge. The bottom side of the cartridge has a plurality of depressions therein. Each of the depressions has a peripheral edge has a blade member securely attached thereto and extending away therefrom. The cartridge is removably securable in the cavity such that cam may force the cartridge downward through paper stock positioned on the base portion.

In these respects, the card cutting apparatus according to the present invention substantially departs from the conventional concepts and designs of the prior art, and in so doing provides an apparatus primarily developed for the purpose of cutting business cards out of paper stock.

SUMMARY OF THE INVENTION

In view of the foregoing disadvantages inherent in the known types of card cutting devices now present in the prior art, the present invention provides a new card cutting apparatus construction wherein the same can be utilized for cutting business cards out of paper stock.

The general purpose of the present invention, which will be described subsequently in greater detail, is to provide a new card cutting apparatus apparatus and method which has many of the advantages of the card cutting devices mentioned heretofore and many novel features that result in a new card cutting apparatus which is not anticipated, rendered obvious, suggested, or even implied by any of the prior art card cutting devices, either alone or in any combination thereof.

To attain this, the present invention generally comprises a housing. The housing comprises a base portion and an upper portion. The base portion has an upper side and a lower side. The upper portion is hingedly coupled to the base portion such that the upper portion may be selectively positioned between an abutted position and a removed position with respect to the base portion. The upper portion has a top surface, a bottom surface, a front surface, a back surface and a pair of side surfaces. The bottom surface has a cavity therein. A rod is rotatably mounted in the upper portion, and extends through the side surfaces and through the cavity such that the rod has a pair of ends each extending away from one of the side surfaces. The rod extends through and securely attached to a cam. A handle member is coupled to each of the ends of the rod. Each of a plurality of cartridges comprises a substantially rigid panel having a top side, a bottom side, a pair of side edges, a front edge and a back edge. The bottom side of the cartridge has a plurality of depressions therein. Each of the depressions has a peripheral edge has a blade member securely attached thereto and extending away therefrom. The cartridge is removably securable in the cavity such that cam may force the cartridge downward through paper stock positioned on the base portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new card cutting apparatus apparatus and method which has many of the advantages of the card cutting devices mentioned heretofore and many novel features that result in a new card cutting apparatus which is not anticipated, rendered obvious, suggested, or even implied by any of the prior art card cutting devices, either alone or in any combination thereof.

It is another object of the present invention to provide a new card cutting apparatus which may be easily and efficiently manufactured and marketed.

It is a further object of the present invention to provide a new card cutting apparatus which is of a durable and reliable construction.

An even further object of the present invention is to provide a new card cutting apparatus which is susceptible of a low cost of manufacture with regard to both materials and labor, and which accordingly is then susceptible of low prices of sale to the consuming public, thereby making such card cutting apparatus economically available to the buying public.

Still yet another object of the present invention is to provide a new card cutting apparatus which provides in the apparatuses and methods of the prior art some of the advantages thereof, while simultaneously overcoming some of the disadvantages normally associated therewith.

Still another object of the present invention is to provide a new card cutting apparatus for cutting business cards out of paper stock.

Yet another object of the present invention is to provide a new card cutting apparatus which includes a housing. The housing comprises a base portion and an upper portion. The base portion has an upper side and a lower side. The upper portion is hingedly coupled to the base portion such that the upper portion may be selectively positioned between an abutted position and a removed position with respect to the base portion. The upper portion has a top surface, a bottom surface, a front surface, a back surface and a pair of side surfaces. The bottom surface has a cavity therein. A rod is rotatably mounted in the upper portion, and extends through the side surfaces and through the cavity such that the rod has a pair of ends each extending away from one of the side surfaces. The rod extends through and securely attached to a cam. A handle member is coupled to each of the ends of the rod. Each of a plurality of cartridges comprises a substantially rigid panel having a top side, a bottom side, a pair of side edges, a front edge and a back edge. The bottom side of the cartridge has a plurality of depressions therein. Each of the depressions has a peripheral edge has a blade member securely attached thereto and extending away therefrom. The cartridge is removably securable in the cavity such that cam may force the cartridge downward through paper stock positioned on the base portion.

Still yet another object of the present invention is to provide a new card cutting apparatus that allows a user to print business indicia on conventional paper stock and cut business cards from that stock in variety of shapes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new card cutting apparatus according to the present invention.

FIG. 2 is a schematic perspective view of the present invention.

FIG. 5 is a schematic perspective view of the present invention.

DESCRIPTION OF THE PREFERRED EMBODIMENT

Figure 3:
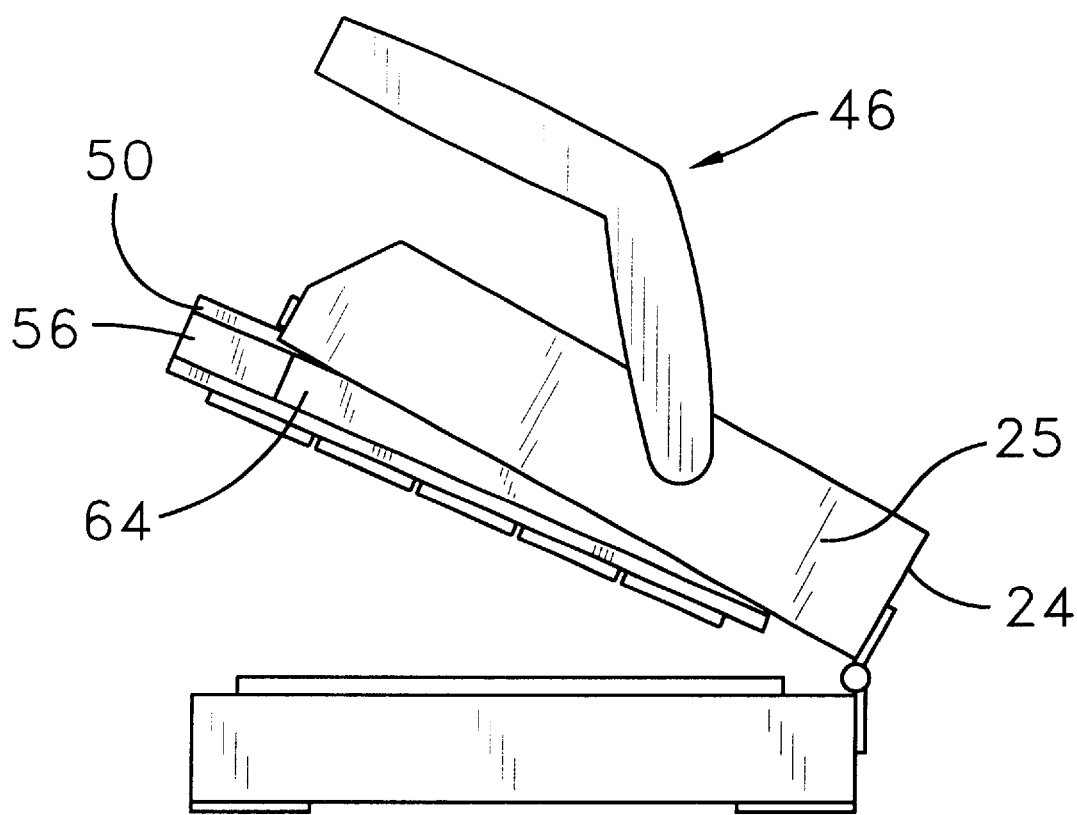
FIG. 3 is a schematic side view of the present invention.
Figure 4:
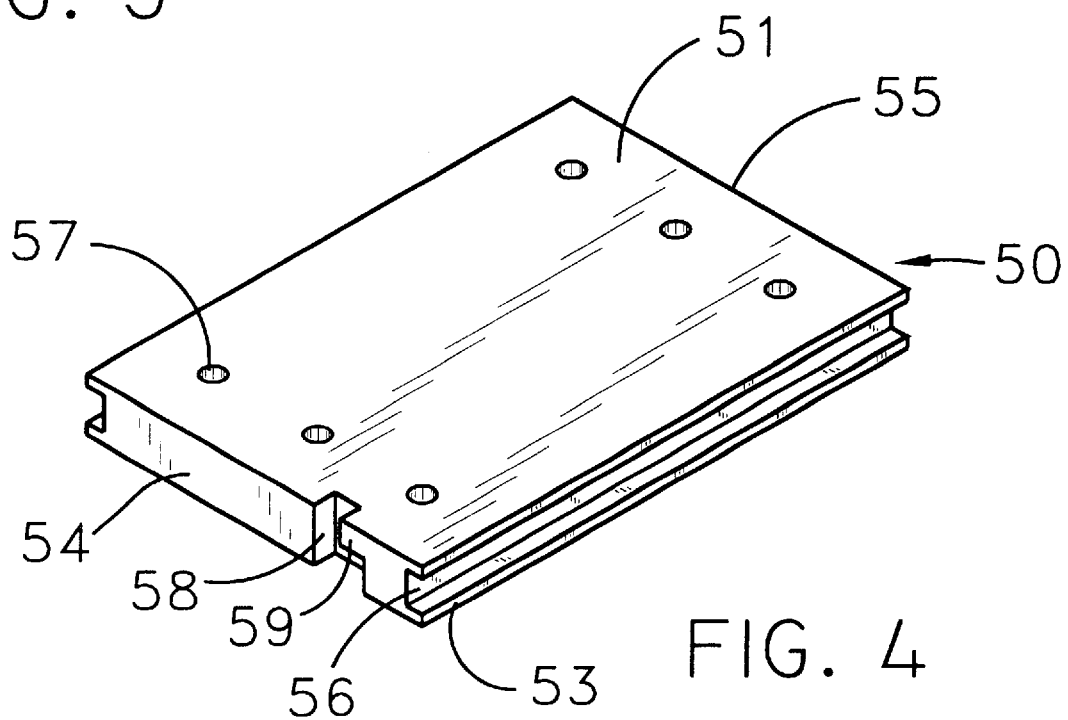
FIG. 4 is a schematic top perspective view of the cartridge of the present invention.
Figure 4A:
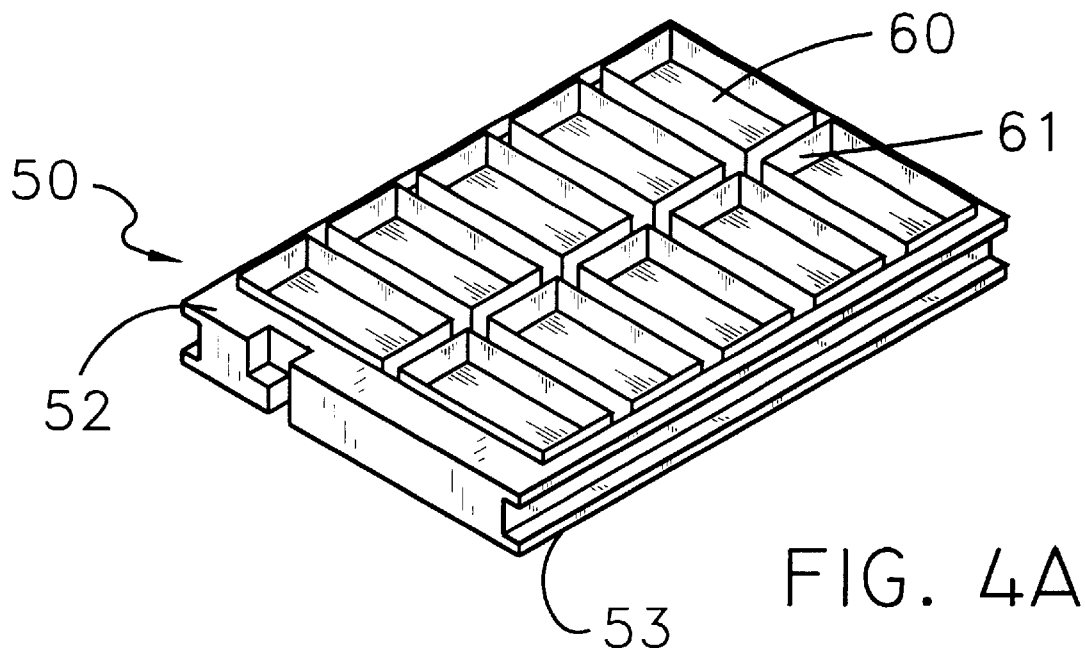
FIG. 4A is a schematic bottom perspective view of a cartridge of the present invention.
Figure 11A:
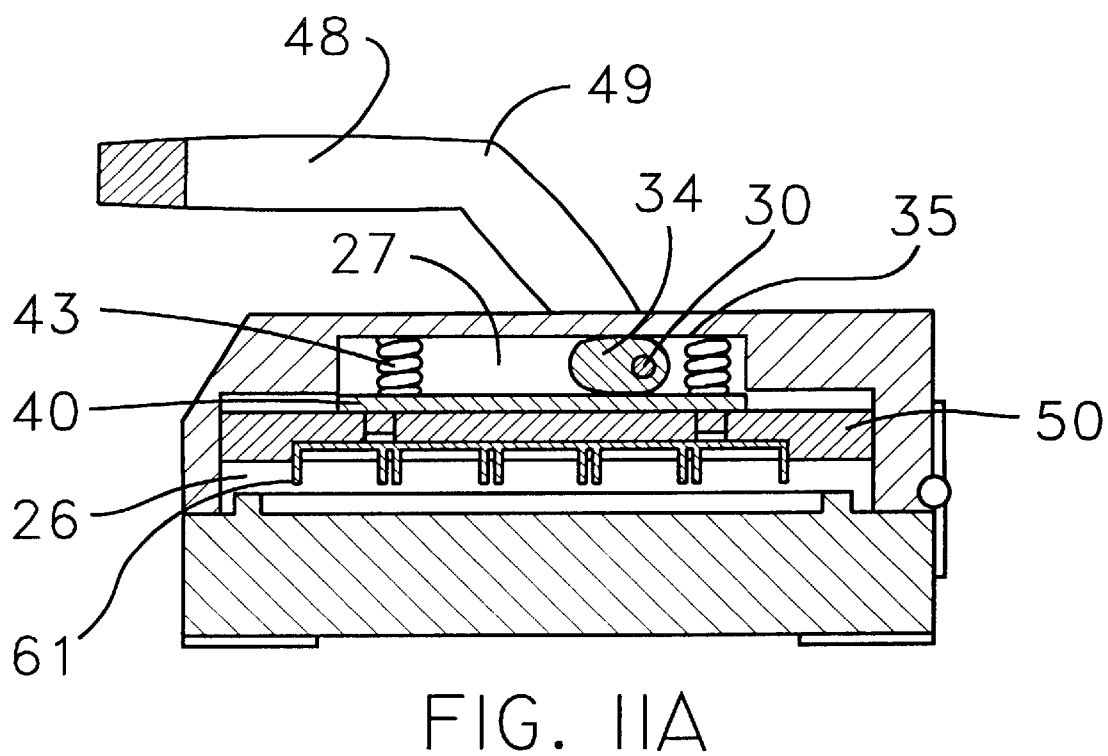
FIG. 11A is a schematic cross-sectional view taken along line 11—11 of the present invention with the handle in a non-engaging position.
Figure 6:
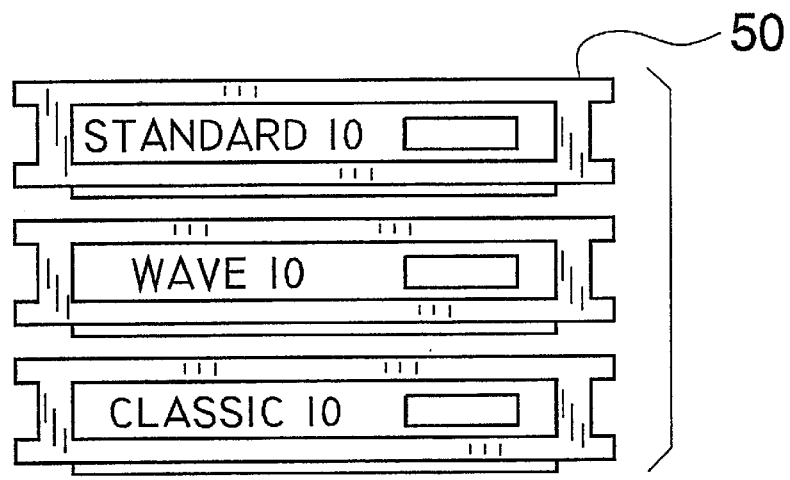
FIG. 6 is a schematic side view of a plurality of cartridges of the present invention.

With reference now to the drawings, and in particular to FIGS. 1 through 14 thereof, a new card cutting apparatus embodying the principles and concepts of the present invention and generally designated by the reference numeral 10 will be described.

As best illustrated in FIGS. 1 through 14, the card cutting apparatus 10 generally comprises a housing 12. Generally, the housing 12 has a base portion 14 and an upper portion 20.

The base portion 14 has an upper side 15 and a lower side 16. Preferably, the lower side 16 has a plurality of legs 17 thereon. The upper side 15 is substantially planar. The upper side 15 has a perimeter wall 18 integrally coupled thereto and extending upwardly therefrom. The perimeter wall 18 has a generally rectangular shape. The perimeter wall has a break 19 therein. Conventional paper stock 8 used for business cards may be placed within the rectangular perimeter.

The upper portion 20 is hingedly coupled to the base portion 14 such that the upper portion 20 may be selectively positioned between an abutted position and a removed position with respect to the base portion 14. The upper portion 20 substantially covers the base portion 14 in the abutted position. The upper portion 20 has a top surface 21, a bottom surface 22, a front surface 23, a back surface 24 and a pair of side surfaces 25. The bottom surface 22 has a cavity 26 therein. The cavity 26 has a generally rectangular shape such that the peripheral wall 18 may extend into the cavity 26 in the abutted position. The cavity 26 has a channel 27 therein. The cavity 26 has a pair of sides walls 28 each orientated generally parallel to each other and the side surfaces 25. Each of the side walls 28 has a notch 29 therein positioned relatively nearer the back surface 24 than the front surface 23.

A rod 30 is rotatably mounted in the upper portion 20. The rod 30 extends through the side surfaces 25 and preferably through the channel 27, though it may travel through the cavity 26, such that the rod 30 has a pair of ends 31, 32 each extending away from one of the side surfaces 25.

An elongate cam 34 has a generally oval shape taken transversely to a longitudinal axis of the cam such that the oval shape of the cam has a first and second focal point. The rod 30 extends through and generally along the first focal point of the cam 34 such that the second focal point may be selectively positioned between a point relatively adjacent to an inside surface 35 of the channel 27 and a point relatively extending away from the channel 27.

A plate 40, which is substantially rigid, has a first side 41 and a second side 42. The plate 40 is movably mounted in the channel 27 such that the cam 34 is positioned between the inner surface 35 of the channel 27 and the first side 41 of the plate 40. A plurality of biasing means 43 bias the plate 40 toward the inner surface 35 of the channel 27. The biasing means 43 extend between and are coupled to the inner surface 35 of the channel 27 and the first side 41 of the plate 40. Each of the biasing means 43 comprises a spring. The biasing means 43 bias the plate 40 inward toward the channel 27 such that the second focal point of the cam 34 is biased against the inner surface 35. The second side 42 of the plate 40 has a plurality of nubs 44 thereon.

A handle member 46 is comprised of a bar portion 47 and two legs 48. Each of the legs 48 is integrally coupled to and extends away from an opposite end of the bar portion 47. The handle member 46 is generally U-shaped. Each of the legs 48 is securely attached to one of the ends 31, 32 of the rod 30. Each of the legs 48 has a bend 49 therein such that the legs 48 extend away from the rod 30 and toward the front surface 23 of the upper portion 20.

Figure 7:
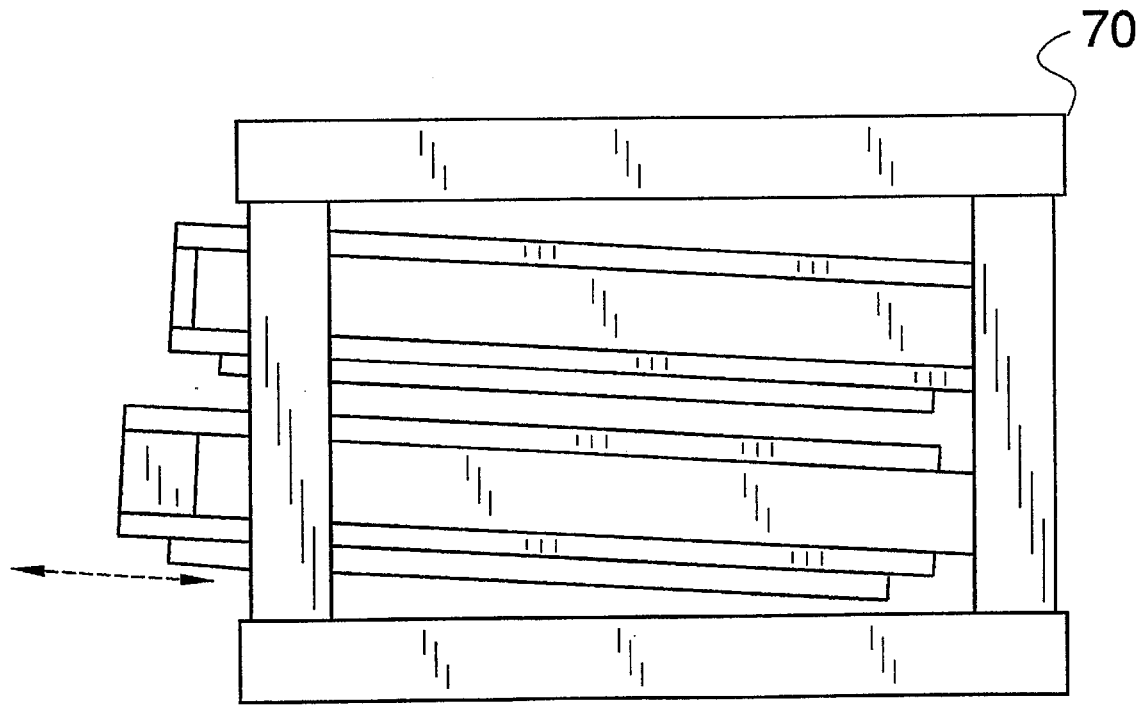
FIG. 7 is a schematic side view of a cartridge holding device of the present invention.
Figure 8:
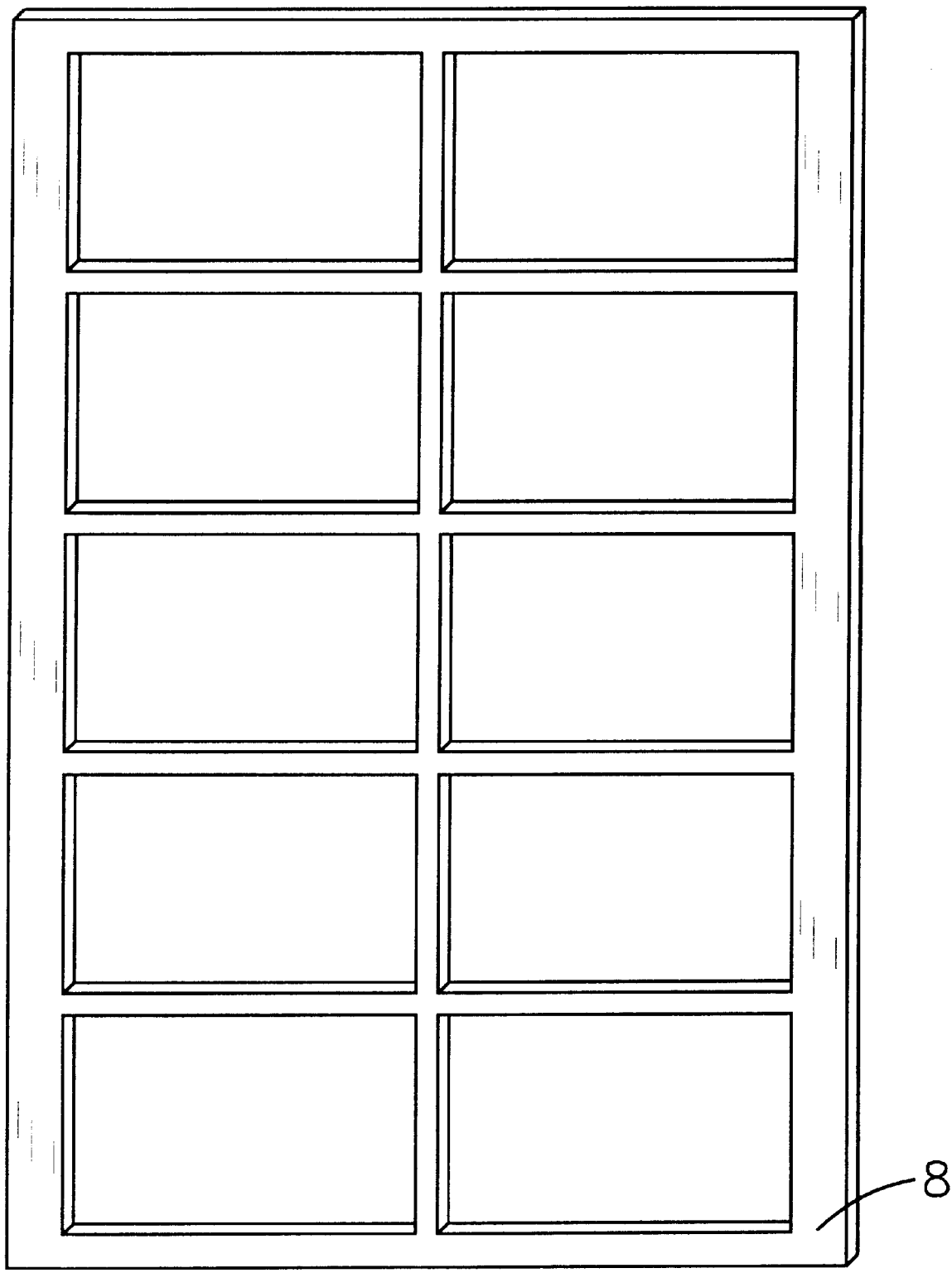
FIG. 8 is a schematic top view of paper stock after being cut by the present invention.
Figure 9:
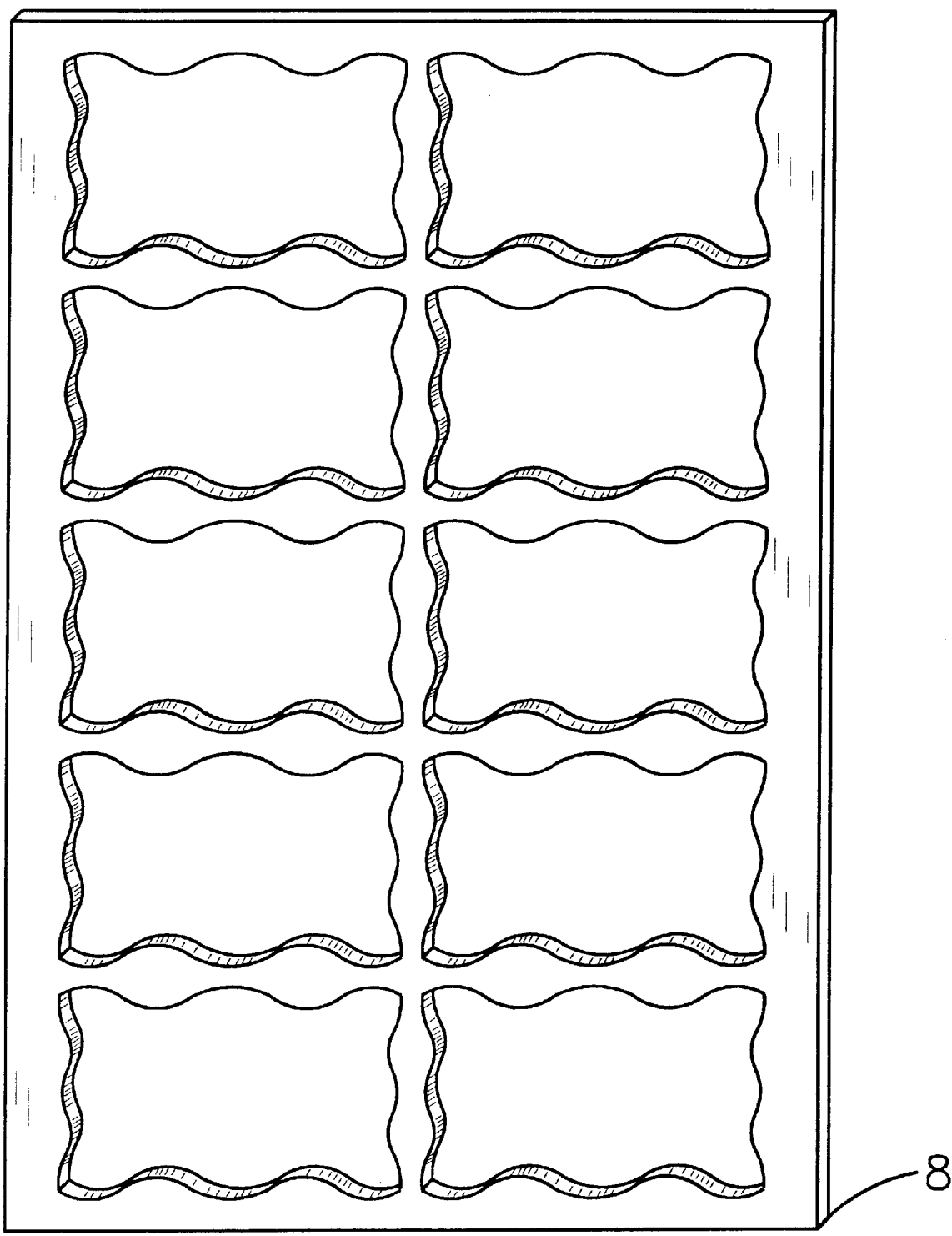
FIG. 9 is a schematic top view of paper stock after being cut by the present invention.
Figure 10:
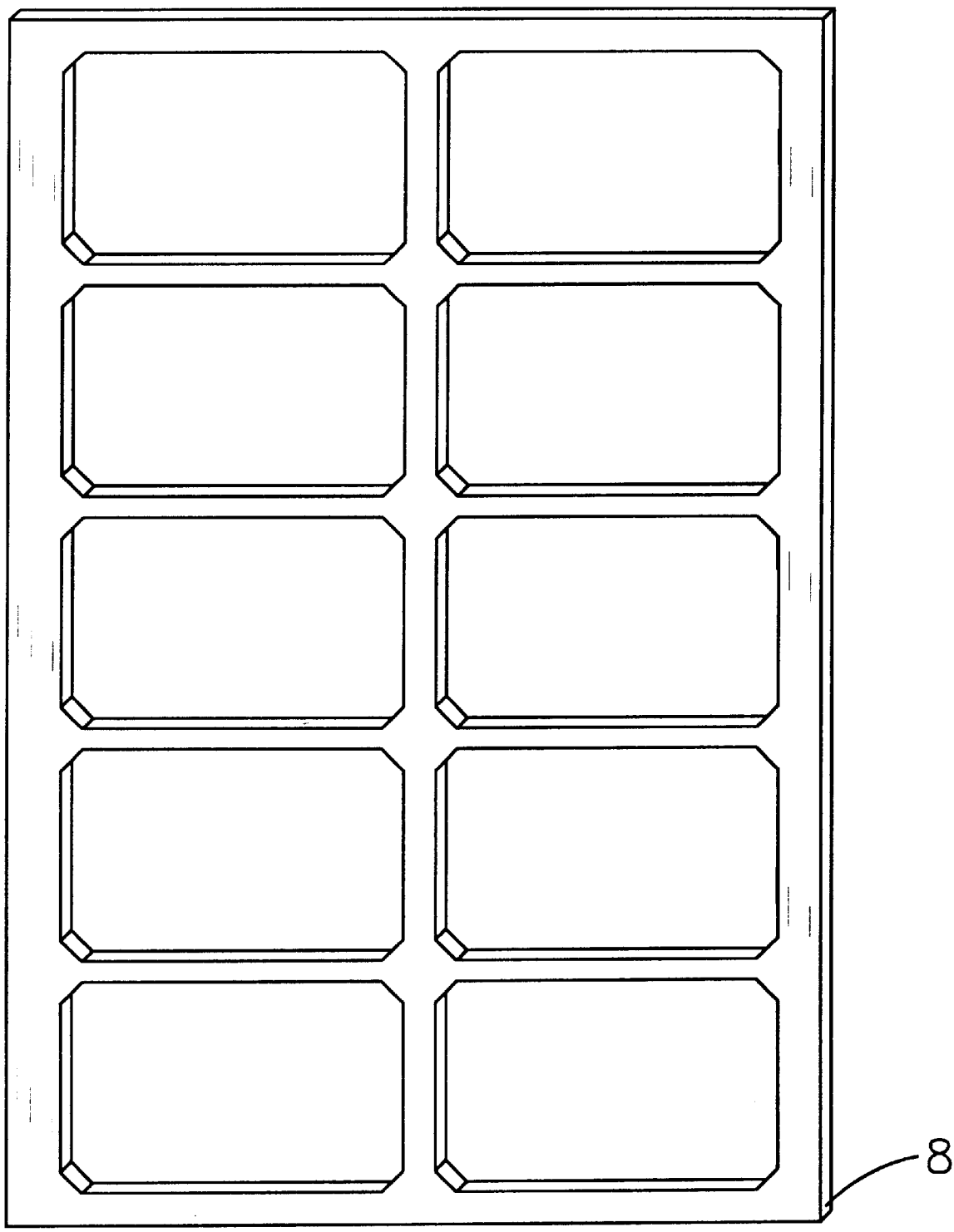
FIG. 10 is a schematic top view of paper stock after being cut by the present invention.
Figure 11:
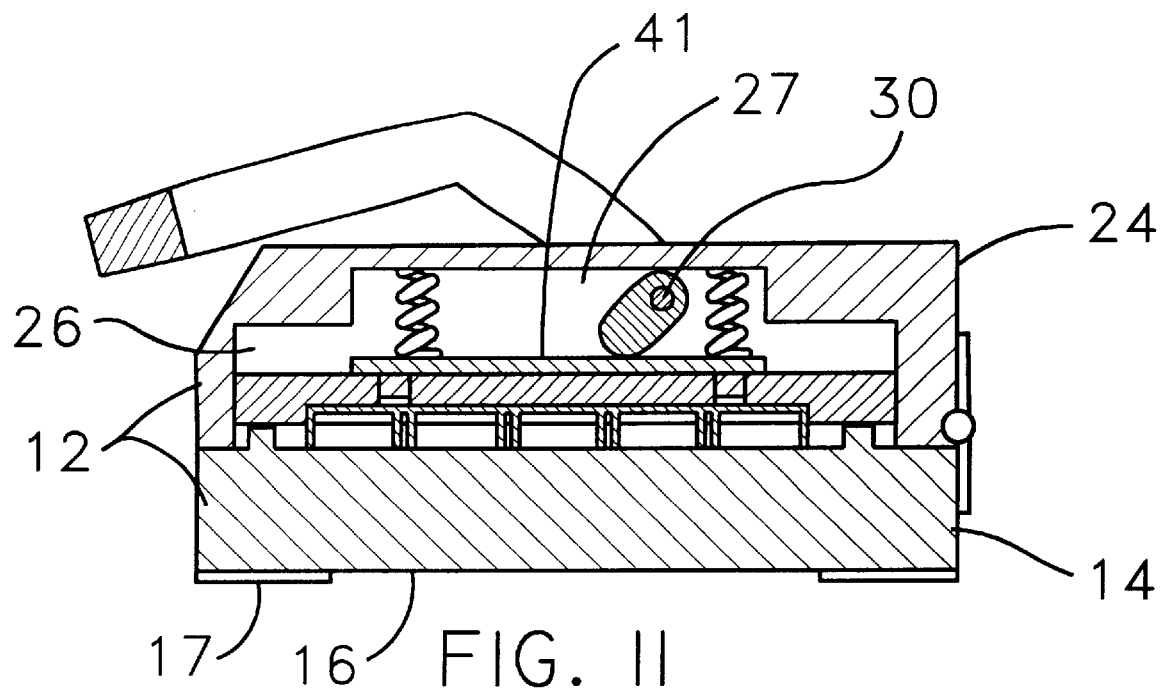
FIG. 11 is a schematic cross-sectional view taken along line 11—11 of the present invention.
Figure 12:
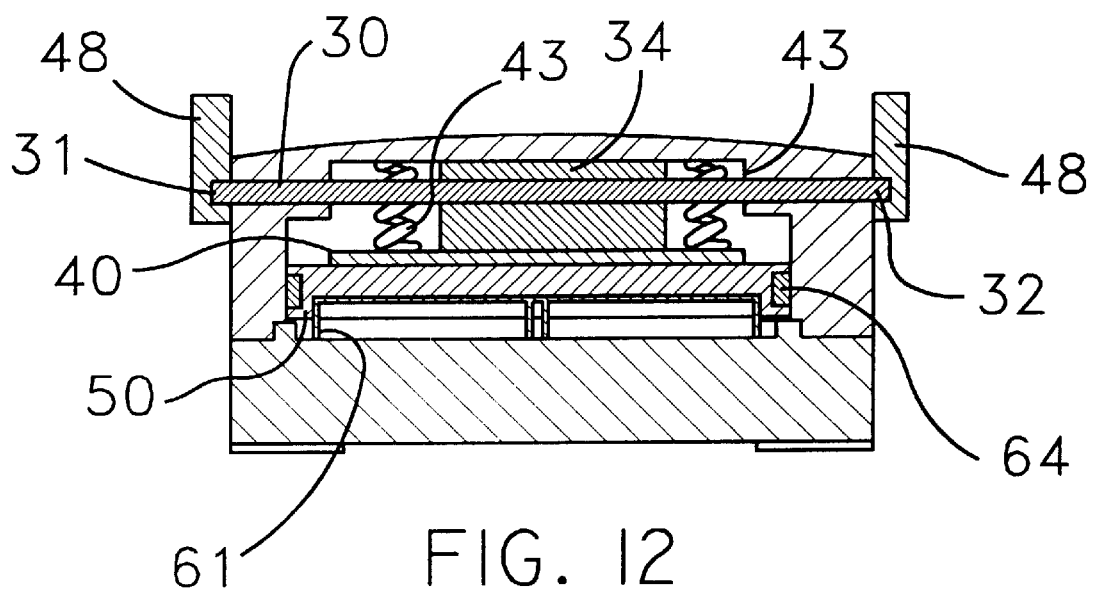
FIG. 12 is a schematic cross-sectional view taken along line 12—12 of the present invention.
Figure 13:
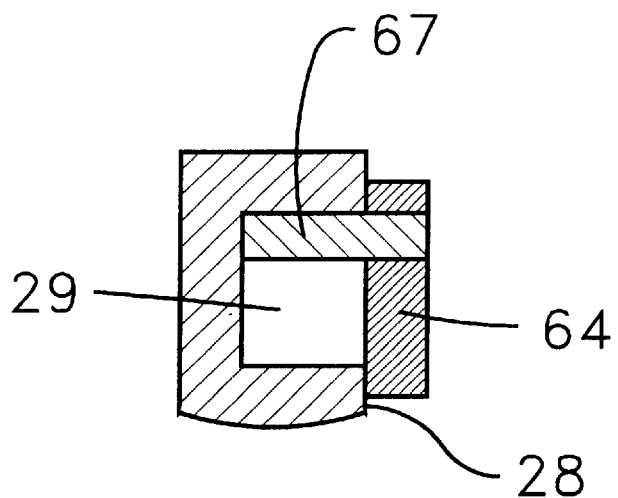
FIG. 13 is a schematic cross-sectional view taken along line 13—13 of the present invention.
Figure 14:
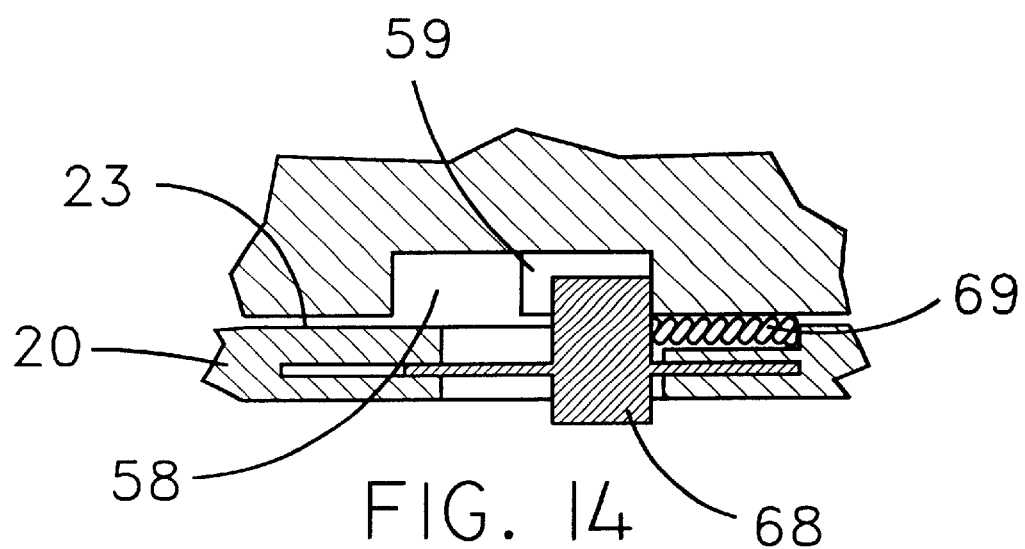
FIG. 14 is a schematic cross-sectional view taken along line 14—14 of the present invention.

Each of a plurality of cartridges 50 comprises a substantially rigid panel having a top side 51, a bottom side 52, a pair of side edges 53, a front edge 54 and a back edge 55. Each of the side edges 53 has an elongate slot 56 therein extending between the front 54 and back 55 edges. The top side 51 has a plurality of bores 57 therein each positioned to receive one of the nubs 44. The front edge 54 has a slot 58 therein. The slot 58 in the front edge 54 has two side walls and a back wall. A shoulder 59 extends into the slot 58 from the top side 51 and one of the side walls of the slot 58. The bottom side 52 of the cartridge 50 has a plurality of depressions 60 therein. Each of the depressions 60 has a peripheral edge having a blade member 61 securely attached thereto and extending away therefrom. The depressions 60 of a first cartridge generally have a rectangular shape. A second cartridge has depressions generally having rectangular shapes having wavy sides. A third cartridge has depressions generally having rectangular shapes having clipped corners. These shapes are shown in paper stock 8 in FIGS. 8, 9 and 10 which have had business cards cut out using the device 10. These are three of the preferred shapes, though virtually any shape may be utilized. Each of the cartridges 50 has a generally rectangular shape. Preferably, a cartridge 50 holding device 70, as shown in FIG. 7, is included for the storage of a plurality of cartridges 50.

A securing means removably secures one of the cartridges 50 in the cavity 26. The securing means includes a pair of guide rails 64. Each of the guide rails 64 is adapted to movably extend in one of the elongate slots 56. Each of the guide rails 64 is elongate and has a first end 65 and a second end 66. A pair of dowel portions 67 each is coupled to one of the guide rails 64 and positioned generally adjacent to the first ends 65. Each of the dowel portions 67 is rotatably positioned in one of the notches 29. The dowels may move vertically with respect to the top 21 and bottom 22 surfaces of the upper portion 20.

An actuator 68 selectively couples with the slot 58 in the front edge of the cartridge 50. The actuator 68 is movably positioned in the front surface 23 of the upper portion 20. The actuator 68 is adapted to releasably engage the slot 58. A biasing means 69, which biases the actuator 68 under the shoulder 59, comprises a spring mounted in the front surface 23.

In use, the guide rails 64 are rotated downwardly to engage the elongate slots 56. The cartridge 50 is then slid into the cavity 26 and secured in place using the actuator 68. The nubs 44 are positioned in the bores 57 to hold the cartridge 50 steady. Paper stock 8 is placed on the base portion 14 in the peripheral wall 18. The paper stock 8 will preferably already have indicia printed thereon. The upper portion 20 is lowered over the base portion 14. The handle member 46 is brought downward as shown in 11. The cam 34 pushes the plate 40 down which in turn forces the cartridge 50 down so that the blade members 61 may cut through the paper stock 8. The dowel portions 67 move up and down to accommodate the movement of the cartridge 50.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A business card cutting apparatus for cutting business cards out of paper, said apparatus comprising:

a housing, said housing comprising;
    a base portion, said base portion having an upper side and a lower side;
    an upper portion, said upper portion being hingedly coupled to said base portion such that said upper portion may be selectively positioned between an abutted position and a removed position with respect to said base portion, said upper portion having a top surface, a bottom surface, a front surface, a back surface and a pair of side surfaces, said bottom surface having a cavity therein;
a rod, said rod being rotatably mounted in said upper portion, said rod extending through said side surfaces and through said cavity such that said rod has a pair of ends each extending away from one of said side surfaces;

a cam, said rod extending through and securely attached to said cam;

a handle member being coupled to each of said ends of said rod;

a plurality of cartridges, each of said cartridges comprising a substantially rigid panel having a top side, a bottom side, a pair of side edges, a front edge and a back edge, said bottom side of said cartridge having a plurality of depressions therein, each of said depressions having a peripheral edge having a blade member securely attached thereto and extending away therefrom.

2. The business card cutting apparatus as in claim 1, wherein said base portion further comprises:

said upper side being substantially planar, said upper side having a perimeter wall integrally coupled thereto and extending upwardly therefrom, said perimeter wall having a generally rectangular shape, said perimeter wall having a break therein, wherein paper may be placed within said rectangular perimeter.

3. The business card cutting apparatus as in claim 2, wherein said upper portion comprises:

said cavity having a generally rectangular shape such that said peripheral wall may extend into said cavity in said abutted position.

4. The business card cutting apparatus as in claim 1, further comprising:

said cavity having a channel therein, said cavity having a pair of sides walls each orientated generally parallel to each other and said side surfaces;

said rod extending through said channel;

said cam having a generally oval shape taken transversely to a longitudinal axis of said cam such that said cam has a first and second focal point, said rod extending through and generally along said first focal point of said cam such that said second focal point may be selectively positioned between a point relatively adjacent to an inside surface of said channel and a point relatively extending away from said channel;

a plate, said plate being substantially rigid, said plate having a first side and a second side, said plate being movably mounted in said channel such that said cam is positioned between said inner surface of said channel and said first side of said plate, a plurality of biasing means biases said plate to said inner surface of said channel, said biasing means extending between and coupling said inner surface of said channel and said first side of said plate, wherein said biasing means bias said plate toward said channel such that said second focal point of said cam is biased against said inner surface, said second side having a plurality of nubs thereon; and said top side having a plurality of bores therein each positioned to receive one of said nubs.

5. The business card cutting apparatus as in claim 4, further comprising:

each of said side edges of said cartridges having an elongate slot therein extending between said front and back edges, said front edge having a slot therein, said slot having two side walls and a back wall, a shoulder extending into said slot from said top side and one of said side walls;

each of said side walls of said cavity having a notch therein positioned relatively nearer said back surface than said front surface; and a securing means for removably securing one of said cartridges in said cavity.

6. The business card cutting apparatus as in claim 5, wherein said securing means comprises:

a pair of guide rails, each of said guide rails being adapted to movably extend in one of said elongate slots, each of said guide rails being elongate and having a first end and a second end, a pair of dowel portions each being coupled to one of said guide rails and positioned generally adjacent to said first ends, each of said dowel portions being rotatably positioned in one of said notches, wherein said dowels may move vertically with respect to said top and bottom surfaces of said upper portion; and an actuator for selectively coupling with said slot in said front edge of said cartridge, said actuator being movably positioned in said front surface of said front surface, said actuator being adapted to releasably engage said slot, a biasing means for biasing said actuator under said shoulder comprises a spring mounted in said front portion.

7. A business card cutting apparatus for cutting business cards out of paper, said apparatus comprising:

a housing, said housing comprising;

a base portion, said base portion having an upper side and a lower side, said lower side having a plurality of legs thereon, said upper side being substantially planar, said upper side having a perimeter wall integrally coupled thereto and extending upwardly therefrom, said perimeter wall having a generally rectangular shape, said perimeter wall having a break therein, wherein paper may be placed within said rectangular perimeter;

an upper portion, said upper portion being hingedly coupled to said base portion such that said upper portion may be selectively positioned between an abutted position and a removed position with respect to said base portion, said upper portion substantially covering said base portion in said abutted position, said upper portion having a top surface, a bottom surface, a front surface, a back surface and a pair of side surfaces, said bottom surface having a cavity therein, said cavity having a generally rectangular shape such that said peripheral wall may extend into said cavity in said abutted position, said cavity having a channel therein, said cavity having a pair of sides walls each orientated generally parallel to each other and said side surfaces, each of said side walls having a notch therein positioned relatively nearer said back surface than said front surface;

a rod, said rod being rotatably mounted in said upper portion, said rod extending through said side surfaces and through said channel such that said rod has a pair of ends each extending away from one of said side surfaces;

a cam, said cam being elongate, said cam having a generally oval shape taken transversely to a longitudinal axis of said cam such that said cam has a first and second focal point, said rod extending through and generally along said first focal point of said cam such that said second focal point may be selectively positioned between a point relatively adjacent to an inside surface of said channel and a point relatively extending away from said channel;

a plate, said plate being substantially rigid, said plate having a first side and a second side, said plate being movably mounted in said channel such that said cam is positioned between said inner surface of said channel and said first side of said plate, a plurality of biasing means bias said plate to said inner surface of said channel, said biasing means extend between and are coupled to said inner surface of said channel and said first side of said plate, each of said biasing means comprising a spring, wherein said biasing means bias said plate toward said channel such that said second focal point of said cam is biased against said inner surface, said second side having a plurality of nubs thereon;

a handle member, said handle member having a bar portion and two legs, each of said legs being integrally coupled to and extending away from an opposite end of said bar portion, said handle member being generally U-shaped, each of said legs being securely attached to one of said ends of said rod, each of said legs having a bend therein such that said legs extend away from said rod and toward said front surface of said upper portion;

a plurality of cartridges, each of said cartridges comprising a substantially rigid panel having a top side, a bottom side, a pair of side edges, a front edge and a back edge, each of said side edges having an elongate slot therein extending between said front and back edges, said top side having a plurality of bores therein each positioned to receive one of said nubs, said front edge having a slot therein, said slot having two side walls and a back wall, a shoulder extending into said slot from said top side and one of said side walls, said bottom side of said cartridge having a plurality of depressions therein, each of said depressions having a peripheral edge having a blade member securely attached thereto and extending away therefrom, said depressions of a first cartridge generally having a rectangular shape, a second cartridge having depressions generally having rectangular shapes having wavy sides, a third cartridge having depressions generally having rectangular shapes having clipped corners, each of said cartridges having a generally rectangular shape;

a securing means for removably securing one of said cartridges in said cavity, said securing means comprising;

a pair of guide rails, each of said guide rails being adapted to movably extend in one of said elongate slots, each of said guide rails being elongate and having a first end and a second end, a pair of dowel portions each being coupled to one of said guide rails and positioned generally adjacent to said first ends, each of said dowel portions being rotatably positioned in one of said notches, wherein said dowels may move vertically with respect to said top and bottom surfaces of said upper portion; and an actuator for selectively coupling with said slot in said front edge of said cartridge, said actuator being movably positioned in said front surface of said upper portion, said actuator being adapted to releasably engage said slot, a biasing means for biasing said actuator under said shoulder comprises a spring mounted in said front surface.

* * * * *